United States Patent
Wolokita et al.

(10) Patent No.: US 11,949,447 B2
(45) Date of Patent: Apr. 2, 2024

(54) SMART SCHEDULING OF TSCH NETWORKS TO AVOID SELF-INTERFERENCE

(71) Applicant: Analog Devices International Unlimited Company, Limerick (IE)

(72) Inventors: Andre Wolokita, Melbourne (AU); Lance Doherty, Somerville, MA (US); Sean Williams, Melbourne (AU); Gina Aquilano, Somerville, MA (US); Michael O'Brien, Munster (IE); Cornelius O'Mahony, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 413 days.

(21) Appl. No.: 17/288,298

(22) PCT Filed: Nov. 12, 2019

(86) PCT No.: PCT/EP2019/081073
§ 371 (c)(1),
(2) Date: Apr. 23, 2021

(87) PCT Pub. No.: WO2020/099437
PCT Pub. Date: May 22, 2020

(65) Prior Publication Data
US 2021/0376877 A1 Dec. 2, 2021

Related U.S. Application Data
(60) Provisional application No. 62/758,767, filed on Nov. 12, 2018.

(51) Int. Cl.
*H04W 72/53* (2023.01)
*H04B 1/715* (2011.01)
(Continued)

(52) U.S. Cl.
CPC .......... *H04B 1/715* (2013.01); *H04W 72/535* (2023.01); *H04W 72/542* (2023.01);
(Continued)

(58) Field of Classification Search
CPC ............. H04W 72/542; H04W 52/243; H04W 52/245; H04W 52/241; H04B 1/7156;
(Continued)

(56) References Cited

U.S. PATENT DOCUMENTS 5,696,903 A   12/1997 Mahany
5,799,012 A   8/1998 Ayerst et al.
(Continued)

FOREIGN PATENT DOCUMENTS

CN   1360414 A   7/2002
CN   105580331 A   5/2016
(Continued)

OTHER PUBLICATIONS

Choi, Kanghoon, et al., "Enhanced time-slotted channel hopping scheduling with quick setup time for industrial Internet of Things networks", Int'l Journal of Distributed Sensor Networks, vol. 13(6), (2017), 14 pgs.
(Continued)

*Primary Examiner* — Emmanuel Bayard
(74) *Attorney, Agent, or Firm* — Schwegman Lundberg & Woessner, P.A.

(57) ABSTRACT

A wireless communication system includes a network manager configured to wirelessly communicate with a plurality of wireless nodes of a wireless network. The network manager and at least one wireless node include a transceiver connected to transmit and receive wireless communication via an antenna. The network manager and/or the wireless node include a cognitive engine configured to receive information regarding an environment of the wireless network as
(Continued)

input and, in response, generate configuration data as output. Subsequent communication on the wireless network is updated using the configuration data.

20 Claims, 8 Drawing Sheets

(51) Int. Cl.
  *H04W 72/50* (2023.01)
  *H04W 72/542* (2023.01)
  *H04B 1/7156* (2011.01)

(52) U.S. Cl.
  CPC .... *H04B 2001/7152* (2013.01); *H04B 1/7156* (2013.01); *H04B 2201/692* (2013.01)

(58) Field of Classification Search
  CPC ...... H04B 2001/7152; H04B 2201/692; H04B 1/7143; H04B 17/309; H04B 17/318; H04B 17/336; H04B 17/345; H04B 1/715
  USPC ......................................... 375/219
  See application file for complete search history.

(56) References Cited

U.S. PATENT DOCUMENTS

| | | | |
|---|---|---|---|
| 6,374,311 | B1 | 4/2002 | Mahany et al. |
| 7,974,253 | B2 | 7/2011 | Laroia et al. |
| 9,019,829 | B2 | 4/2015 | Sebire et al. |
| 9,166,648 | B2 | 10/2015 | Shudark et al. |
| 9,942,956 | B1 | 4/2018 | Chen et al. |
| 2004/0252651 | A1 | 12/2004 | Karlsen et al. |
| 2010/0110997 | A1* | 5/2010 | Erceg ............... H04W 72/23 370/329 |
| 2015/0200846 | A1 | 7/2015 | Hui et al. |
| 2015/0327260 | A1 | 11/2015 | Hui et al. |
| 2016/0020967 | A1 | 1/2016 | Thubert et al. |
| 2016/0021011 | A1 | 1/2016 | Vasseur et al. |
| 2016/0021647 | A1 | 1/2016 | Hui et al. |
| 2016/0043815 | A1* | 2/2016 | Panaitopol .......... H04W 24/08 370/252 |
| 2016/0174192 | A1 | 6/2016 | Raghu et al. |
| 2017/0055236 | A1* | 2/2017 | Levesque .......... H04W 56/0015 |
| 2017/0156144 | A1 | 6/2017 | Shudark et al. |
| 2018/0035442 | A1 | 2/2018 | Jin |
| 2018/0146489 | A1* | 5/2018 | Jin .................... H04W 72/12 |
| 2018/0302911 | A1* | 10/2018 | Aijaz .................. H04L 12/189 |
| 2020/0229206 | A1* | 7/2020 | Badic ................ H04W 52/0209 |

FOREIGN PATENT DOCUMENTS

| | | |
|---|---|---|
| CN | 107276628 A | 10/2017 |
| CN | 113170406 A | 7/2021 |
| JP | 2017528956 A | 9/2017 |

OTHER PUBLICATIONS

Elsts, Atis, et al., "Scheduling High-Rate Unpredictable Traffic in IEEE 802.15.4 TSCH Networks", 13th Int'l Conference on Distributed Computing in Sensor Systems (DCOSS), (Jun. 2017), 9 pgs.

Hermeto, Rodrigo Teles, et al., "Scheduling for IEEE802.15.4-TSCH and Slow Channel Hopping MAC in Low Power Industrial Wireless Networks: A Survey", Computer Communications, vol. 114, Issue C, (Dec. 2017), 37 pgs.

Incel, Durmaz Ozlem, et al., "MC-LMAC: A multi-channel MAC protocol for wireless sensor networks", Ad Hoc Networks 9, (2011), 22 pgs.

Kerkez, Branko, "Adaptive Time Synchronization and Frequency Channel Hopping for Wireless Sensor Networks", Dept.of Electrical Engineering and Computer Sciences, University of California at Berkeley, MS Plan II Research Project., (Jun. 2012), 84 pgs.

Meng, Mei, et al., "Scheduling for Data Transmission in Multi-Hop IEEE 802.15.4e TSCH Networks", Mobile Networks and Applications 23(4), (May 2017), 7 pgs.

"Chinese Application Serial No. 201980074427.7, Office Action dated Oct. 9, 2023", w/o English Translation, 4 pgs.

"European Application Serial No. 19805914.9, Communication Pursuant to Article 94(3) EPC dated Mar. 1, 2023", 14 pgs.

"European Application Serial No. 19805914.9, Response filed Jul. 5, 2023 to Communication Pursuant to Article 94(3) EPC dated Mar. 1, 2023", 21 pgs.

* cited by examiner

| TIME SLOTS | | | | | | | |
|---|---|---|---|---|---|---|---|
| MAC CHANNEL OFFSETS | | 0 | 1 | 2 | 3 | 4 | 5 | 6 |
| | 0 | | | | | | | 1 Mbps |
| | 1 | | | | | | 1 Mbps | |
| | 2 | | | | | | | |
| | 3 | | | | | 500 Kbps | | |
| | 4 | 2 Mbps | | | | | | |
| | 5 | | | | 500 Kbps | | | |
| | 6 | | | 500 Kbps | | | | |
| | 7 | | 500 Kbps | | | | | |
| | 8 | | 500 Kbps | | | | | |

FIG. 8

SMART SCHEDULING OF TSCH NETWORKS TO AVOID SELF-INTERFERENCE

CLAIM OF PRIORITY

This is a U.S. NSPCT Application claiming the benefit of priority to PCI Application Serial No. PCT/EP2019/081073, filed Nov. 12, 2019, and published as WO 2020/099437 A2 on May 22, 2020, which claims priority to U.S. Provisional Application Ser. No. 62/758,767, filed Nov. 12, 2018 which are hereby incorporated by reference herein in their entirety.

TECHNICAL FIELD

This document pertains generally, but not by way of limitation, to wireless networks, and particularly but not by way of limitation to cognition in wireless networks, including those scheduled using time synchronized channel hopping (TSCH).

BACKGROUND

Wireless networks provide communication between nodes without the cost and complexity of routing cables. Wireless networks often have to deal with various forms of interference, resulting in imperfect environments for wireless communication. This interference can require retransmission of wireless data packets, increasing latency within the network.

SUMMARY

In one example, a wireless node is configured to enhance one or more of power efficiency, interference immunity, packet latency, or packet throughput using dynamically-established link configurations. The wireless node includes a transceiver configured to transmit and receive wireless communication via an antenna, the wireless node configured to receive wireless communication from a network manager. The wireless node also includes a cognitive engine configured to receive information regarding the network environment as input and, in response, generate transmission configuration data as output. The wireless node is configured to generate a data communication for transmission by the node transceiver to the network manager using the generated configuration data.

In another example, a wireless communication system includes a network manager configured to wirelessly communicate with a plurality of wireless nodes of a wireless network according to a communication schedule. The network manager includes a transceiver configured to transmit and receive wireless communication via an antenna, and a cognitive engine configured to receive information regarding an environment of the wireless network as input and, in response, generate transmission configuration data as output. The network manager is configured to transmit an updated communication schedule to the plurality of wireless nodes that includes the generated transmission configuration data.

In another example, a method of wireless communication includes communicating, via a transceiver of a wireless device, wireless data with other devices of a wireless network; extracting information regarding an environment of the wireless network from communication of the wireless data; providing the information to a cognitive engine of the wireless device to generate, by the cognitive engine, configuration data; and communicating subsequent wireless data according to an updated communication configuration using the generated configuration data.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

A wireless communication system is disclosed herein capable of monitoring the wireless network environment and transmission metrics to adapt wireless communication occurring within the network. Wireless networks can be implemented in a wide variety of environments, including heavily metallic environments, and environments with competing radio-frequency (RF) transmissions. In one illustrative example, the wireless network can schedule communication on one or more frequencies between devices using time synchronized channel hopping (TSCH) schemes.

The network devices can establish, update, and maintain one or more models or other representations of the environment by monitoring both the environment itself (e.g., RF interference), and characteristics of data communications within the network. The output of the models or other algorithms can be used by one or more devices within the network when selecting wireless link parameters, for example, for data communication. The wireless link parameters can include selectable aspects such as one or more of a transmission channel, a transmission data rate, a modulation format, a transmission power, a packet format, and a channel coding scheme. For example, an environment model can generate a selected channel frequency and selected data rate for a node that will facilitate data transmission using minimal power consumption.

In TSCH scheduled networks, data communication can occur on multiple channels and at multiple data rates. In some examples, a network manager node can select both transmission channel frequencies and transmission data rates for each wireless node of the network. In other examples, a set of channel frequencies and a set of data rates can be provided to each wireless node, allowing a respective node to select a channel frequency and data rate from the sets of channel frequencies and data rates for each transmission. In these examples, each node and/or the network manager can include cognitive engines to aid in the selection of channel frequencies and data rates for each transmission.

Figure 1A:
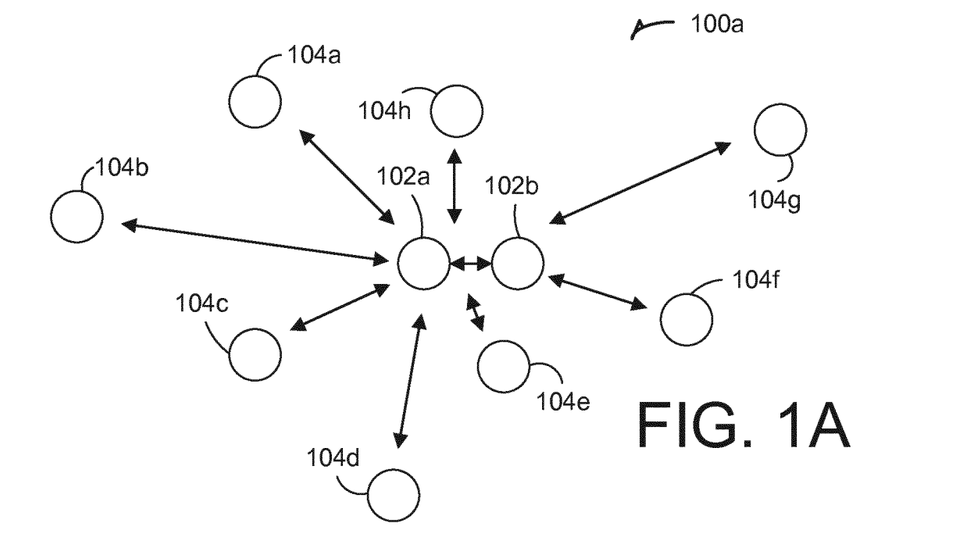
FIG. 1A is a network diagram illustrating an example network according to a star topology.
Figure 1B:
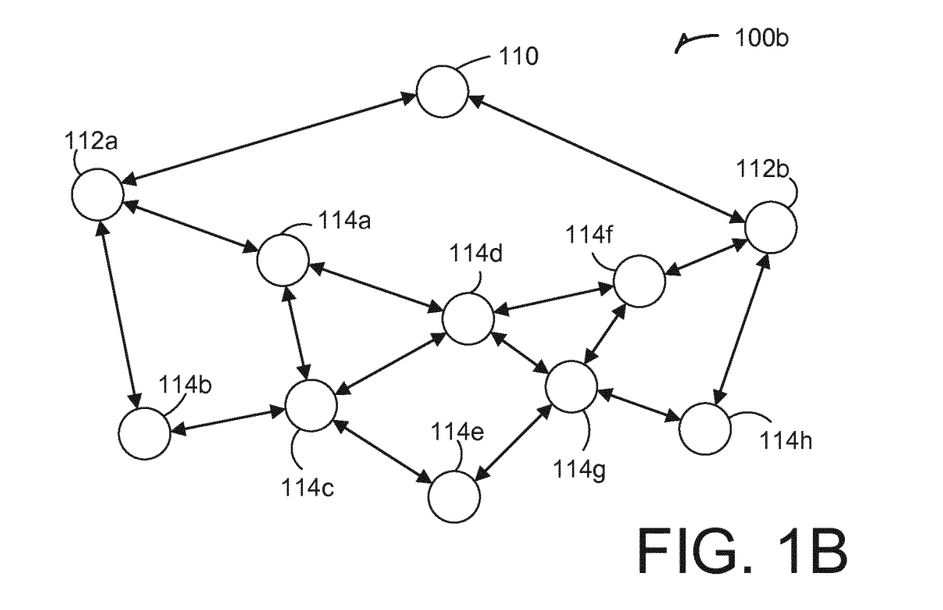
FIG. 1B is a network diagram illustrating an example network according to a mesh topology.

FIG. 1A is a network diagram illustrating an example network 100a configured using a star topology, and FIG. 1B is a network diagram illustrating an example network 100b configured using a mesh topology. Other network topologies not illustrated in FIGS. 1A and 1B can also be used, such as multi-hop topologies, for example. In the example illustrated in FIG. 1A, the network 100a includes two network managers 102a and 102b each configured to communicate with nodes 104a-104h. While illustrated as eight nodes 104a-104h and two network managers 102a and 102b, the network 100a can include any number of network managers connected to communicate with any number of nodes.

In an example, the network 100a can be implemented on a vehicle to monitor the health of a vehicle component(s), such as a battery. In this example, the nodes 104a-104h can be placed throughout the vehicle and configured to sense characteristics of the monitored components. The sensed characteristics can be provided to the network managers 102a and 102b for data collection and reporting. In some examples, the network managers 102a and 102b can provide the data to a central control system (such as an electronic control unit (ECU) or other element in a vehicular electrical system). The central control system can use the data to monitor the health of, and provide control for, the vehicle component(s). In other examples, the network 100a can be implemented in other applications, such as transportation applications involving aircraft, spacecraft, or rail, or in an industrial setting or any other environment.

The network managers 102a and 102b can be connected to each other via a wired or wireless connection and configured to communicate redundantly with the nodes 104a-104h. Additionally, the network managers 102a and 102b can be connected via a wired or wireless connection to a control system through redundant pathways. In one example, the network managers 102a and 102b can be connected to an ECU via an Ethernet connection.

In the example illustrated in FIG. 1B, the wireless network 100b includes an external network controller 110, network managers 112a and 112b, and nodes 114a-114h configured in a mesh topology. While illustrated as eight nodes 114a-114h, two network managers 112a and 112b, and one external network controller 110, the network 100b can be configured to include any number of nodes, network managers, and external network controllers. The network managers 112a and 112b can be connected to the external network controller 110 through either a wireless or wired connection. The external network controller 110 can also be connected to the internet (not shown) via a wired connection, such as an Ethernet connection, for example.

Wireless communication can occur in either direction between the nodes 104a-104h and the network managers 102a and 102b for the wireless network 100a, and can occur in either direction between any of the nodes 114a-114h, and between the nodes 114a-114h and the network managers 112a and 112b for the wireless network 100b. In each wireless communication, one device acts as the transmitter and the other device acts as the receiver. The data is transmitted using a link configuration that includes several wireless link parameters. In one example, the transmitter can establish a set of wireless link parameters by selecting from a group of possible parameters established by the network. The transmitter packages and sends a data communication to the receiver using the established link parameters. The receiver identifies the link parameters by extracting information from the data communication and extracts a payload from the data communication using the identified link parameters. Generally, the apparatus and techniques described herein facilitate coexistence between nodes (such as nodes 104a-104h in FIG. 1A or nodes 114a-114h in FIG. 1B) in an environment where contemporaneous communication is occurring involving multiple nodes, such as an electrically noisy environment in a vehicular or industrial application.

The network manager devices can include wideband transceivers that are agile across a frequency range (e.g., band) over which the nodes will be communicating (e.g., in a channelized manner). For example, in a network that communicates on the 2.4 GHz Industrial, Scientific, and Medical (ISM) band, each transceiver can be agile across a portion or the entirety of the full 83.5 MHz ISM band (2.4 GHz to 2.4835 GHz). In addition to facilitating data communication with wireless nodes, the wideband transceivers can be used to identify and interpret interferes on the network, estimate link performance, and coordinate node operating frequencies, bit rates, and power levels.

Figure 2:
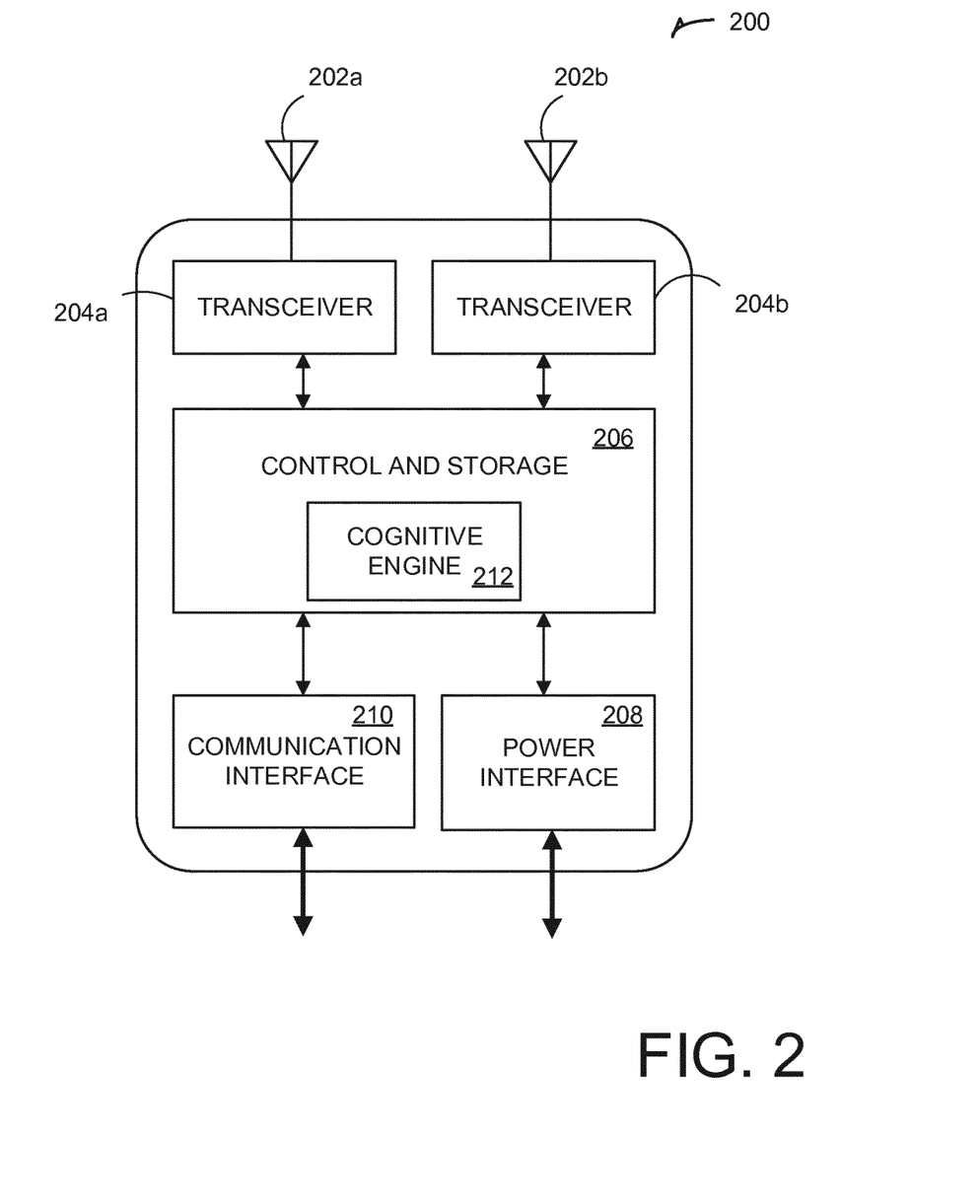
FIG. 2 is a block diagram illustrating an example network manager node device of a wireless network.

FIG. 2 is a block diagram illustrating an example network manager device 200 of a wireless network. The network manager device 200 can be implemented as any one of the network managers 102a or 102b shown in FIG. 1A, the network managers 112a or 112b illustrated in FIG. 1B, or any other wireless node configured to transmit communication to, and receive communication from, another wireless node. In the example illustrated in FIG. 2, the network manager device 200 includes antennas 202a and 202b, transceivers 204a and 204b, a control and memory circuit 206, wired power 208, and a wired communication interface 210. In other examples, the network manager device 200 can include other circuit elements in addition to, or in place of, the components illustrated in FIG. 2. In an example, the two transceivers 204a and 204b can be wideband transceivers that are agile across an entire frequency range over which the nodes will be communicating.

The control and memory circuit 206 can include one or more application-specific or general-purpose processor circuits. Such circuits can include system-on-chip (SoC) realization or such circuits can be field-programmable. As an illustrative example, the control and memory circuit 206 can include two controllers, one being a field programmable gate array (FPGA) and the other being a digital signal processor (DSP). The FPGA can be connected to control multi-channel communication using the two transceivers 204a and 204b, for example, and the DSP can be used for real-time processing such as downsampling, upsampling, coding, or decoding. In other examples, the control and memory circuit 206 can include any number of controllers including FPGAs, DSPs, microprocessors, application specific integrated circuits (ASICs) or other digital logic circuits.

The control and memory circuit 206 can include one or more volatile or non-volatile memories. For example, the control and memory circuit 206 can include one or more non-volatile memories including read-only memories (ROMs), flash memories, solid state drives, or any other non-volatile memory, and one or more volatile memories including, for example, static or dynamic random-access memories (RAM).

In an example, the network manager device 200 can use its transceivers 204a and 204b to monitor and collect data regarding the radio-frequency (RF) environment of the network, as well as collect information regarding transmitted and received communications. The collected data can be used to form or adjust one or more models of the environment and/or one or more algorithms within the cognitive engine 212 using one or more learning techniques, for example. The models can be stored as an analytical representation using one or more data structures implemented in memory of the control and memory circuit 206. The cognitive engine 212 can be used to monitor link quality, including the relative received signal strength (RSSI) and the signal-to-noise ratio (SNR), packet error rates, a health of each node, time stamping, packet travel distance, collision detection, and RF interference within the environment. RF interference in the 2.4 GHz band, for example, can result from Wi-Fi, ZigBee, Bluetooth, and other co-existing protocols. Additionally, networks implemented in highly metallic environments can experience severe attenuation on some channels, while other channels can remain relatively unaffected.

The power interface 208 can be configured to connect through a wired connection to receive power. For example, if the network 100a is implemented on an automobile, the power interface 208 can be connected to receive power from a vehicle power bus, such as a direct current (DC) bus and condition the power for use by the control and memory circuit 208. In some examples, the network manager device 200 can also include a backup power source such as a battery, capacitor, or energy harvester circuit. In some examples, the network manager device 200 may not be powered using a wired power connection and may be powered only using a local power source such as a battery or energy harvester.

The communication interface 210 can be configured for wired communication with one or more of another network manager device 200 and a backend system. For example, a vehicle can include an ECM configured to monitor many aspects of vehicle operation. The network 100a can be configured to provide sensed data to the ECM for one or more monitored aspects of vehicle operation. In some examples, the network manager device 200 can be integrated into the ECM or other backend system. The wired communication can be Ethernet, Controller Area Network (CAN), or any other wired protocol.

Figure 3:
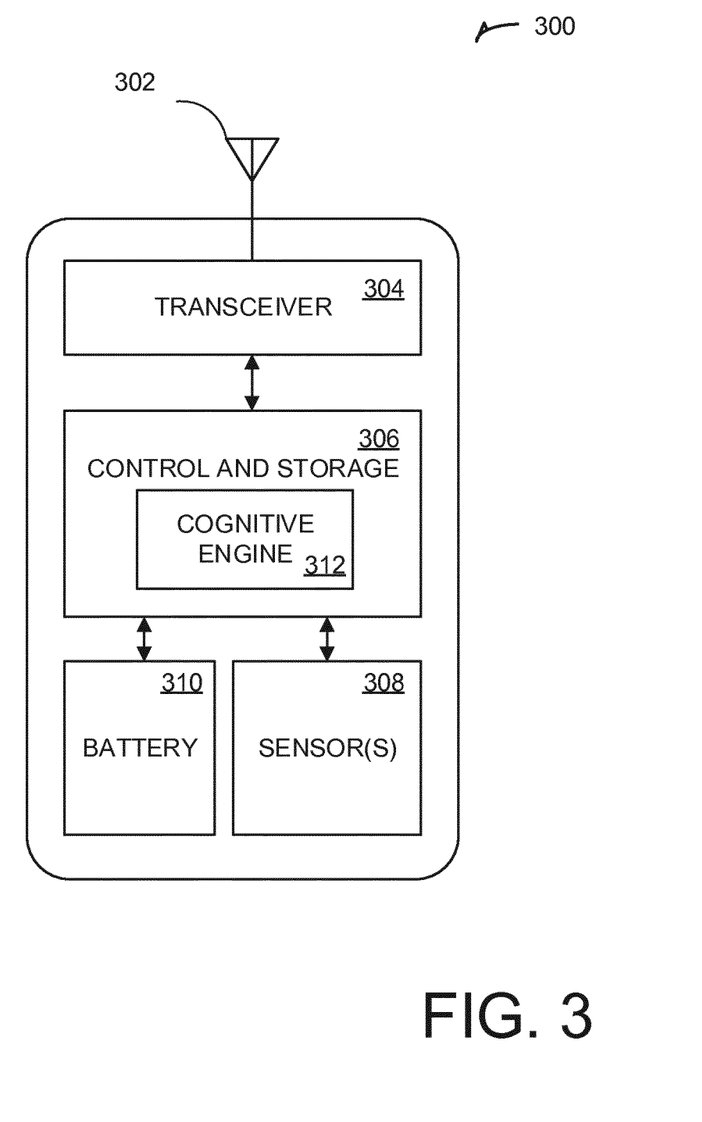
FIG. 3 is a block diagram illustrating an example node device of a wireless network.

FIG. 3 is a block diagram illustrating an example node device 300 of a wireless network. The node device 300 may be any of nodes 104a-104h of FIG. 1A, 114a-114h of FIG. 1B, or any other node in any other wireless network. In the example illustrated in FIG. 3, the node device 300 includes an antenna 302, a transceiver 304, a control and memory circuit 306, sensors 308, and a battery 310. In other examples, the node device 300 can include other circuit elements in addition to, or in place of, the components illustrated in FIG. 3. In an example, the antenna 302 and the transceiver 304 may be configured to transmit and receive communication using RF energy. The battery 310 can be a local battery, or any other energy memory device such as a capacitor or energy harvester. In some examples, the node device 300 may not be powered by local energy storage and may be powered using a wired power connection.

To aid in selecting wireless link configurations to minimize power consumption in the wireless network, for example, the control and memory circuit 306 can include a cognition engine 312. The cognition engine 312 can store or otherwise house a representation of one or models of the network environment, for example, along with one or more policies for selecting link parameters. Output of the cognitive engine 312 can be used by the node device 300 to select a link configuration that results in the greatest chance of successful transmission of data at minimal power consumption.

Models, algorithms, and/or policies of the cognitive engine 312 can be established and updated using, among other things, one or more wireless communication metrics and can be stored as analytical representations using one or more data structures implemented in memory of the control and memory circuit 306. The one or more metrics can be collected by the node device 300 and can include, among other metrics, packet reception statistics, acknowledgment reception statistics, received signal strength indication (RSSI) and signal-to-noise ratio (SNR) of the acknowledgement packet, and packet errors (e.g., incorrect error checking bits).

Following a transmission, the one or more metrics can be used by control and memory circuit 306 to update the models and policies using one or more learning techniques. The learning techniques can include using one or more of a regression model or other model such as a neural network or a rules-based approach such as a decision tree. For example, information indicative of link degradation corresponding to specific channels can trigger modification of link parameters such as channel selection, modulation technique, output power, receiver gain, and the like.

The models and policies of the cognitive engine can be established and updated using network observations in addition to, or in place of, the communication metrics. The network observations can originate from the node device 300, neighboring devices, or from a centralized location such as a network manager node or separate control system. Examples of network observations include performance of power scans of the RF spectrum at each device, detection of other wireless networks using the same or similar spectrum by demodulating packets using, for example, a Wi-Fi scanner, and long-term network health analysis using data obtained regarding the entire network.

The network manager node devices 300 and the node devices 200 can be used to gather knowledge regarding a wireless network 100a or 100b for use by the cognitive engines 212 and 312. A transmission power can be logged for any device 200 or 300 that transmits a data communication within the network. The transmitting device 200 or 300 can receive an acknowledgment that the data communication was successfully received and can log a received signal strength indicator (RSSI) measurement for the acknowledgement packet or for other received transmission. Additionally, for any transmission received, including an acknowledgment packet, the receiving device 200 or 300 can log a signal-to-noise ratio (SNR).

As devices 200 or 300 receive messages, the device 200 or 300 can track a number of transmission attempts prior to receiving an acknowledgment. This number can be monitored with respect to a specific channel frequency to determine a packet reception ratio (PRR) for that frequency. The PRR, along with RSSI, SNR, and other metrics can be monitored with respect to specific channel frequencies to establish link quality indicators for each channel frequency. Additionally, transceivers, particularly wideband transceivers, can be used to sniff the environment to detect RF and other interference from devices outside of the network, and the respective cognitive engines can be configured to determine the type of interference (e.g., Wi-Fi, Zigbee, Bluetooth, and others) based on the observed RF interference over time.

In some examples, timestamping can be used by devices 200 and 300 to collect statistics regarding data transmission with respect to a time of day. Timestamping can also be used to collect location information. For example, in systems with multiple redundant network managers each receiving common messages from wireless nodes, timestamps of the received common messages can be used by the redundant network managers to obtain positional information through triangulation, for example. Various other forms of ranging can also be employed by the devices 200 and 300 to obtain distance or positional information. For example, the devices 200 or 300 can employ phase-based or other forms of RF ranging to determine distance information.

The gathered data can be used by cognitive engines 212 and 312 to adaptively control link configurations for data transmissions within a wireless network. For example, a network manager device 200 or node device 300 can scale its data rate and transmission power based on the determined link quality for a respective transmission channel frequency. Transmitting at a higher bit rate for shorter duration provides lower power consumption compared to reducing transmitter power and bit rate. A higher bit rate can also improve system latency and total throughput. Therefore, in an illustrative example, a device 200 or 300 can, for each link, start with a narrowest bandwidth and highest transmitter power and adjust the two values based on the determined link quality for the respective channel frequency.

Transmission channel frequencies can also be selected intelligently using the gathered data regarding the wireless network. For example, a network manager device 200 can use its transceiver to gather information regarding the RF environment and use the gathered information to coordinate transmission channel frequencies for each of the node devices 300 within the network. In some examples, the network can be scheduled using a TSCH scheme, in which the network manager device 200 can utilize gathered data regarding the environment to update the frequency hopping schedule.

Figure 4:
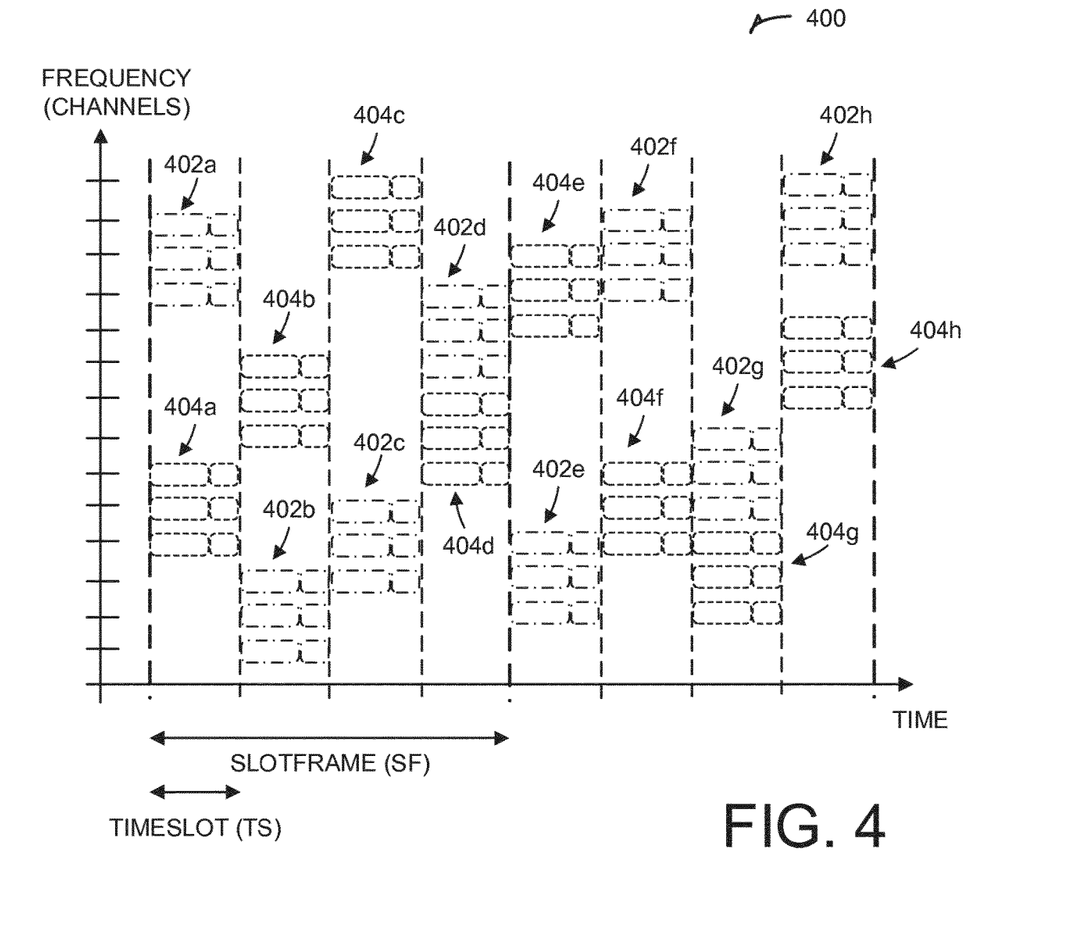
FIG. 4 is a chart illustrating an example time synchronized channel hopping schedule for a wireless network.

FIG. 4 is a chart illustrating an example time synchronized channel hopping (TSCH) schedule 400 for the network 100a, such as can be controlled or established using the models and policies mentioned in relation to other examples herein. The network manager 102, which can be implemented as illustrated in FIG. 2, for example, can include the two transceivers 204a and 204b which permit contemporaneous communication with two nodes 104a-104h on two respective channels. The network 100a can schedule communication between the nodes 104a-104h and the network manager 102, for example, so that each node 104a-104h knows when, and at what frequency, to transmit. While illustrated as permitting two node devices 300 to communicate with an network manager node device contemporaneously, other examples can allow any number (N) of node devices 300 to communicate contemporaneously with the network manager node device. While discussed as implemented using a TSCH scheme, the networks 100a and 100b can be implemented using any other wireless scheduling protocol.

For the TSCH schedule 400, a timeslot is defined. This can be any amount of time, such as 10 ms, to allow for a node 104a-104h to transmit a communication to the network manager 102 and receive an acknowledgement (ACK) from the network manager 102. Each node 104a-104h is allocated one or more predefined timeslots within each slotframe. The timeslots can be static or dynamic, for example, to accommodate transmission of data at any one of several transmission data rates. Each slotframe includes enough timeslots to permit communication from each node 104a-104h to the network manager 102. Each timeslot includes data communications 402a-402h (which include the data transmission and an ACK) from a first node 104a-104h and contemporaneous data communications 404a-404h (which include the data transmission and an ACK) from a second node 402a-402h.

The channel frequency is also allocated for each node 104a-104h for each slotframe. In the example illustrated in FIG. 4, each node 104a-104h receives a set of three possible channel frequencies on which to communicate for each respective timeslot. This is illustrated by the three possible data communications on three respective channels for each data communication 402a-402h and 404a-404h. For example, for the first slotframe illustrated in FIG. 4, a node 104a-104h may be provided three possible channels 402a on which to communicate, and for the second slotframe, may be provided with three possible channels 402e. In other examples, any number of preselected frequencies can be provided to each node 104a-104h for each timeslot. In one example, each slotframe repeats indefinitely so each allocated timeslot represents a repeating communication opportunity for the node.

As seen in FIG. 4, a node 104a-104h can select between several channels on which to transmit. In addition to channel frequency, the node 104a-104h can also select, among others, a transmission data rate, modulation scheme, packet format, and channel coding scheme. The node 104a-104h uses the selected link parameters to prepare and execute a data transmission for the network manager 102. When selecting the link parameters, the respective node 104a-104h can use output from a respective cognitive engine 312 to aid in selection of the parameters. Once the transmission is sent and the acknowledgement received, the respective node 104a-104h can update the models and policies of the cognitive engine 312 for later transmissions. In an example, the network manager 102 can receive the transmissions, determine the selected link parameters using the transmission, and extract a payload from the transmission using the determined parameters.

Figure 5:
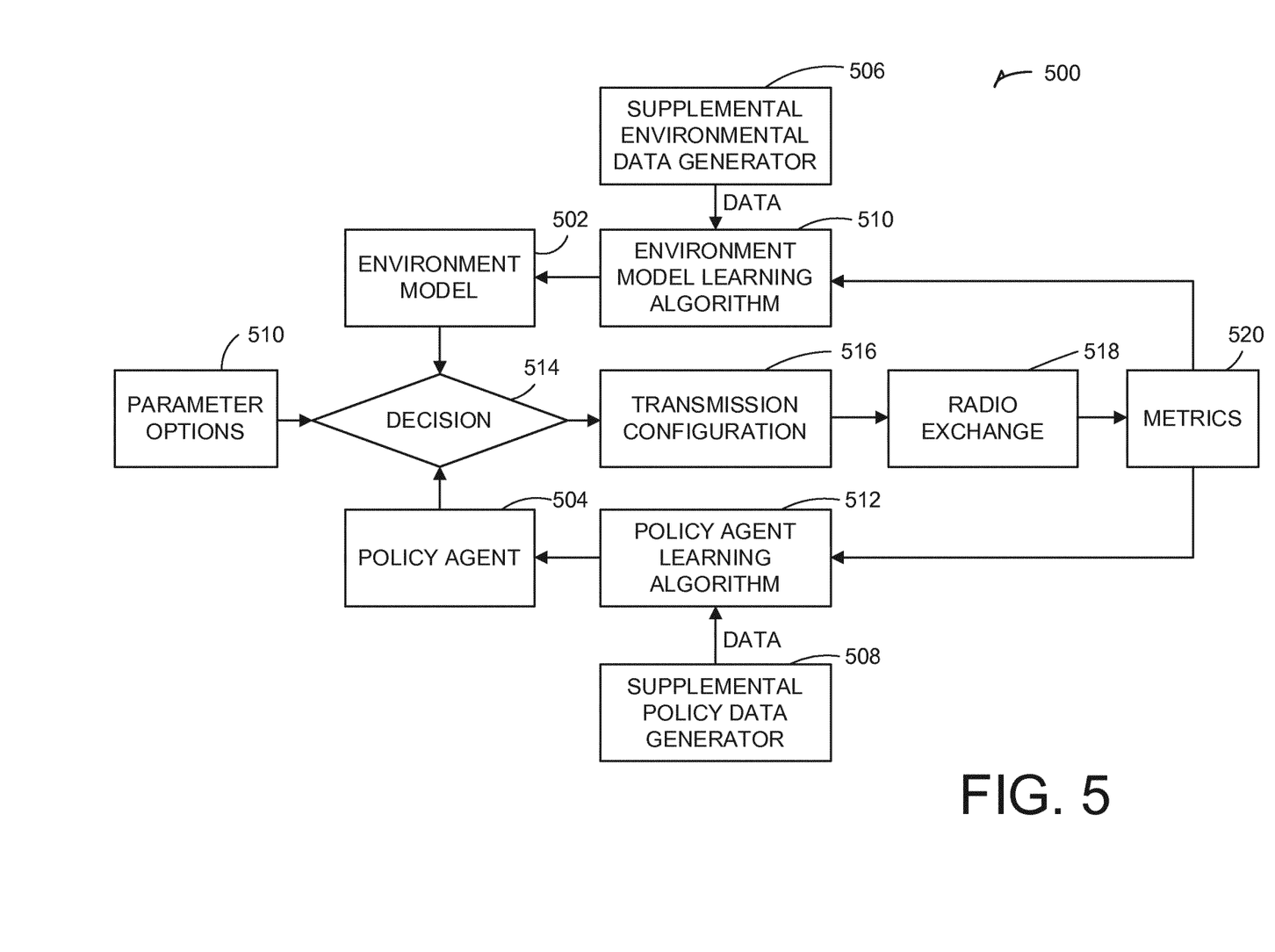
FIG. 5 is a flowchart illustrating a data flow for establishing cognition for a wireless network.

FIG. 5 is a flowchart illustrating a data flow 500 for establishing cognition for a wireless network. The data flow 500 is one illustrative example of a data flow used to establish, update, and maintain models and policies of the cognitive engine 312. The data flow 500 includes an environment model 502, a policy agent 504, an environment data generator 506, a policy data generator 508, transmission parameter options 510, an environment model learning algorithm 510, a policy agent learning algorithm 512, a decision block 514, transmission configuration 516, radio exchange 518, and metrics 520.

Data flow 500 includes environment model 502 and policy agent 504, both of which can be implemented by cognitive engine 312 in an illustrative embodiment. Outputs of the environment model 502 and the policy agent 504 can be used, in conjunction with the parameter options 510, to generate (illustrated by decision block 514) the transmission configuration 516 for an upcoming transmission. The parameter options 510 can be specified for a respective network 100a, for example, and can be static or dynamic. The transmission occurs during the radio exchange 518, and the metrics 520 are obtained from the transmission. In an example, the metrics 520 can include an RSSI and SNR from an acknowledgment packet received as a result of the radio exchange 518. The metrics 520 and supplemental data from the supplemental environment data generator 508 can be used by the environment model learning algorithm 510 to update the environment model 502, and the metrics 520 and supplemental data from the supplemental policy data generator 508 can be used by the policy agent learning algorithm 512 to update the policy agent 504.

In an example, the environmental model 502 can be set up to model each possible transmission channel. For each possible channel, the environmental model 502 can instantiate a moving average filter to track packet transmission results (TXRESMA) and a moving average variance filter to track the RSSI of the received acknowledgement packet (RSSIMAV). The TXRESMA filters will each have one state variable $\mu_1$ tracking the moving average and initialized at instantiation to 1. The RSSIMAV filters will each have one state variable $\mu_2$ tracking the moving average, initialized at instantiation to −100 dBm, and one state variable $\sigma^2$ tracking the moving variance, initialized to 10 dB. Each TXRESMA and RSSIMAV filter will have a parameter $\tau$ which can control the learning rate.

In an example, the policy agent 504 can include a channel policy agent (CPA) and a data rate policy agent (DRPA). The CPA can receive two inputs and produce one output. The inputs can include a set of possible channel frequencies and the corresponding TXRESMA filters. The output can be a selected transmission channel frequency. For example, given a set of possible transmission channel frequencies and corresponding TXRESMA filters, the CPA can select the channel with the greatest current $\mu_1$. If there are two or more channels possessing the greatest $\mu_1$ values, the CPA can randomly select, with equal probability, one of the respective channel frequencies.

The DRPA can receive two inputs and produce one output. The inputs can include a set of possible data rates and the corresponding RSSIMAV filter for the channel selected by the CPA, and the output can be the selected transmission data rate. For example, given a set of possible transmission data rates and RSSIMAV filters corresponding to the channel selected by the CPA, the DRPA can select the data rate using the following two steps. The first step includes calculating an effective RSSI (RSSIE)=$\mu_2$−B*sqrt($\sigma^2$) where B is a parameter determining tolerance to variance. The second step can include choosing, from a table mapping a set of RSSI values (RSSImin) to data rates, the data rate such that RSSIE is greater than the largest possible RSSImin. For example, if the table is {−1000 dBm: 500 kbps, −80 dBm: 1000 kbps, −70 dBm: 2000 kbps} then an example value RSSIE equaling −79 would result in 1000 kbps being selected.

Once the link configuration is selected, the respective node 104a-104h, for example, can transmit a data communication to the network manager 102 using the selected link configuration. To obtain the metrics 520, during packet exchange, the respective node 104a-104h can record the exchange result by recording a 1 for success and 0 for failure, for example, and can record the acknowledgement packet RSSI. The TXRESMA for the channel used in the transmission can be updated with the recorded exchange result, and the RSSIMAV for the channel used in the transmission can be updated with the recorded acknowledge packet RSSI, if one was detected.

At any time during operation, the node 104a-104h can receive information from an external source, such as a network manager, which can be used to alter the environment model 504. For example, the network manager device 200 can include a global environment model and policies learned by the network manager device 200, which can be used to aid in choosing the optimal learning parameters for the environment model learning algorithms of each node device 300. The information learned by the network manager device 200 or other system can indicate, for example, that the environment is rapidly changing around a respective node device 200 and instruct the respective node device 200 to slow the learning rate of its TXRESMA and RSSIMAV to avoid instability.

Figure 6:
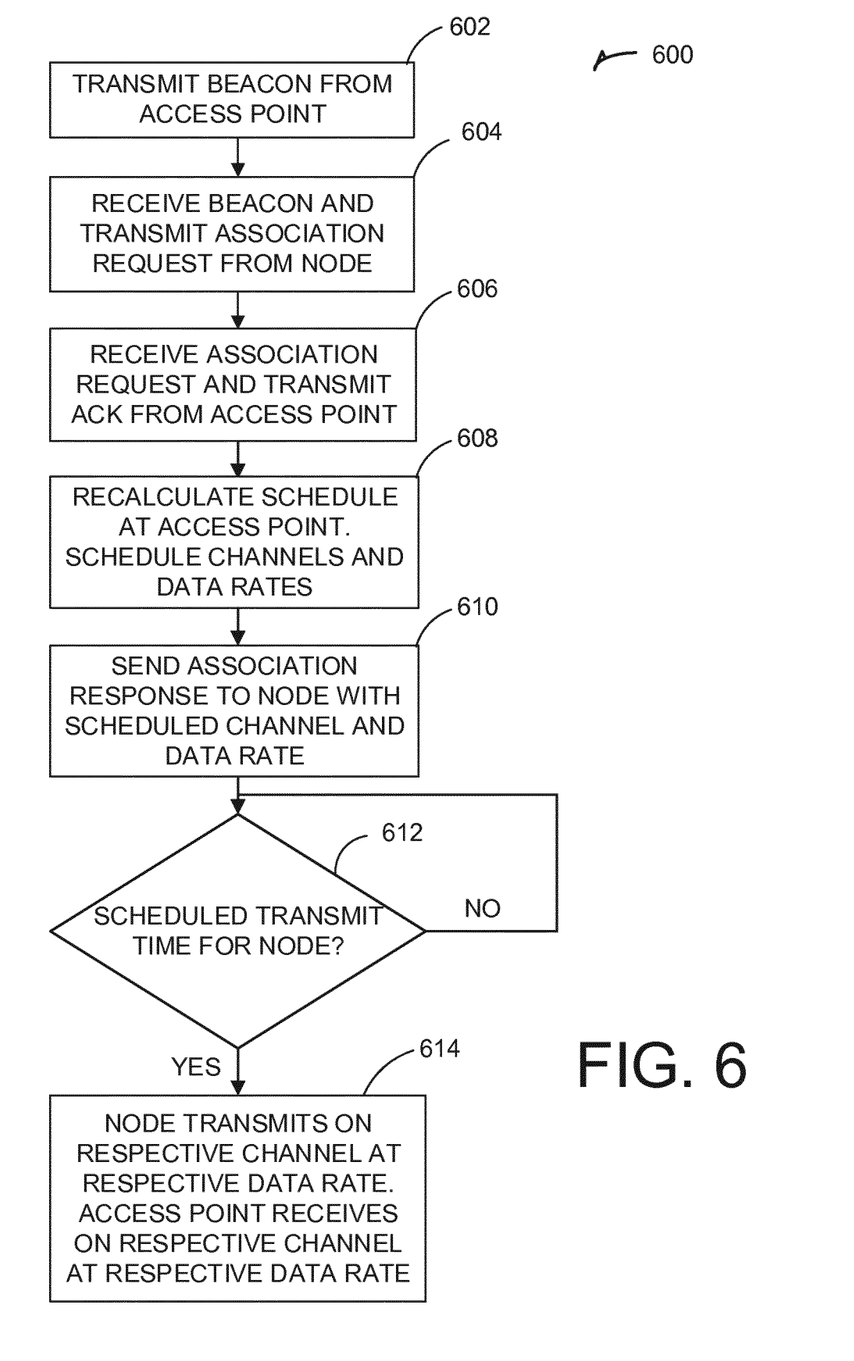
FIG. 6 is a flowchart illustrating an example method of selecting a data rate for a transmission in a time synchronized channel hopping (TSCH) scheduled network.
Figure 7:
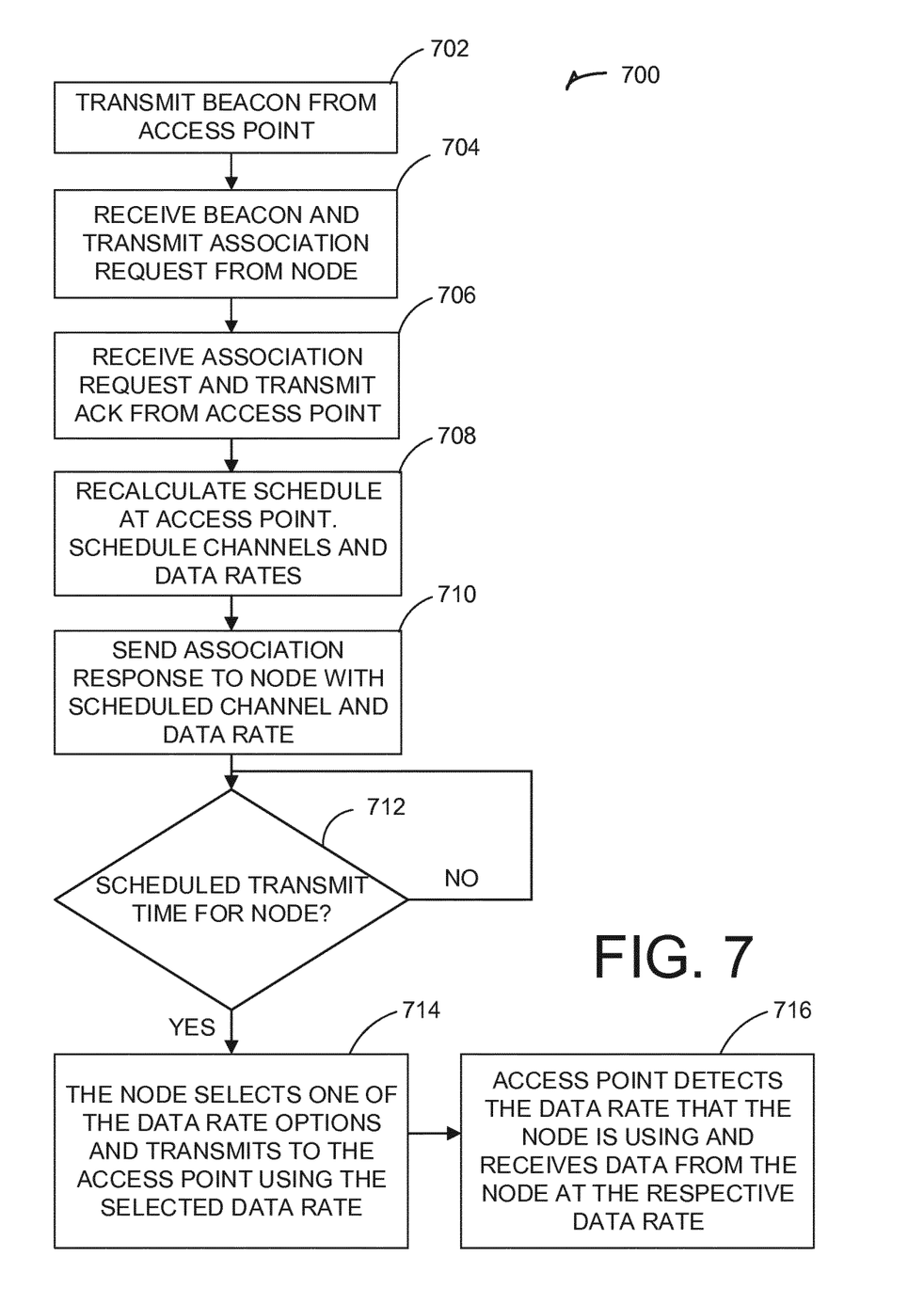
FIG. 7 is a flowchart illustrating another example method of selecting a data rate for a transmission in a time synchronized channel hopping (TSCH) scheduled network.

FIGS. 6 and 7 are flowcharts illustrating respective methods for using multiple data rates within a TSCH implemented network. As discussed above, it can be advantageous to allow a device 200 or 300 to adjust a transmission data rate based on network conditions. FIG. 6 is a flowchart illustrating an example method 600 of handling the use of multiple data rates in a network. At step 602, a node device 300 receives a beacon that is broadcast from a network manager device 200. While described as coming from a network manager device 200, in other examples, such as those involving a mesh network, another node device 300 can transmit the beacon. At step 604, if the node device 300 that received the beacon wishes to join the network, it will transmit an association request to the network manager device 200. At step 606, the network manager device 200 that transmitted the beacon receives the association request and transmits an ACK to the node device 300.

At step 608, assuming the network manager device 200 has decided to accept the association request from the node device 300, the network manager device 200 recalculates its transmission schedule (e.g., TSCH schedule) for the devices with which the network manager device 200 communicates. The network manager device 200 will calculate a slotframe as to which node devices 200 will communicate on which channel frequency. The network manager device 200 will also calculate a data rate at which each node device will communicate during each relevant timeslot. At step 610, the new slotframe information is transmitted to the node device 300, confirming the node device 300 is now part of the network.

At step 612, the node device 300 waits until its respective timeslot to transmit data to the network manager device 200. At step 614, the respective timeslot has arrived and the node device 300 is ready to transmit. The node device 300 transmits data on the scheduled channel frequency and at the scheduled data rate. For example, one node device 300 may be scheduled to transmit on a channel "3" during the second timeslot of the slotframe and at a rate of 2 Mbps, while another node device 300 may be scheduled to transmit on a channel "10" during the third timeslot of the slotframe and at a rate of 500 Kbps.

FIG. 7 is a flowchart illustrating method 700 of using multiple data rates in a TSCH implemented network. Steps 702-706 of method 700 can be similar to steps 602-606 of method 600. At step 708, assuming the network manager device 200 has decided to accept the association request from the node device 300, the network manager device 200 recalculates its TSCH schedule for the devices with which the network manager device 200 communicates. The network manager device 200 will calculate a slotframe as to which node devices 200 will communicate on which channel frequency. The network manager device 200 will also select several data rate options at which each node device can choose to communicate during each relevant timeslot. At step 710, the new slotframe information is transmitted to the node device 300, confirming the node device 300 is now part of the network.

At step 712, the node device 300 waits until its respective timeslot to transmit data to the network manager device 200. During this time, in one example, the node device 300 can use its transceiver 304 to "sniff" the channel on which it is to transmit. This way, the node device 300 can determine if any interference is present on the channel prior to transmission. In other example, the node device 300 can use its cognitive engine 312 to determine the most efficient data rate for the respective channel frequency. At step 714, the respective timeslot has arrived and the node device 300 transmits the data at the selected data rate. At step 716, the network manager device 200 detects the data rate at which the node device 300 is transmitting, receives the data at the respective data rate, and provides an acknowledgement at the respective data rate.

In many TSCH systems, the data rate for each node device 300 is fixed. Because of this, the timeslots are set based on the single data rate. However, when allowing multiple data rates in TSCH implemented networks, the timeslots within each slotframe must be accounted for. In one example, the timeslot duration can be set to a worst-case scenario. For example, if the network allows transmission at three data rates, the timeslot can be set to the amount of time needed to handle a transmission at the slowest data rate. In another example, the timeslot length can be dynamic. For example, the network can select data rates based on the channel upon which the node device 300 is to communicate. Because the network knows which channel is being used for each timeslot, the network can adjust the timeslot length accordingly.

Figure 8:
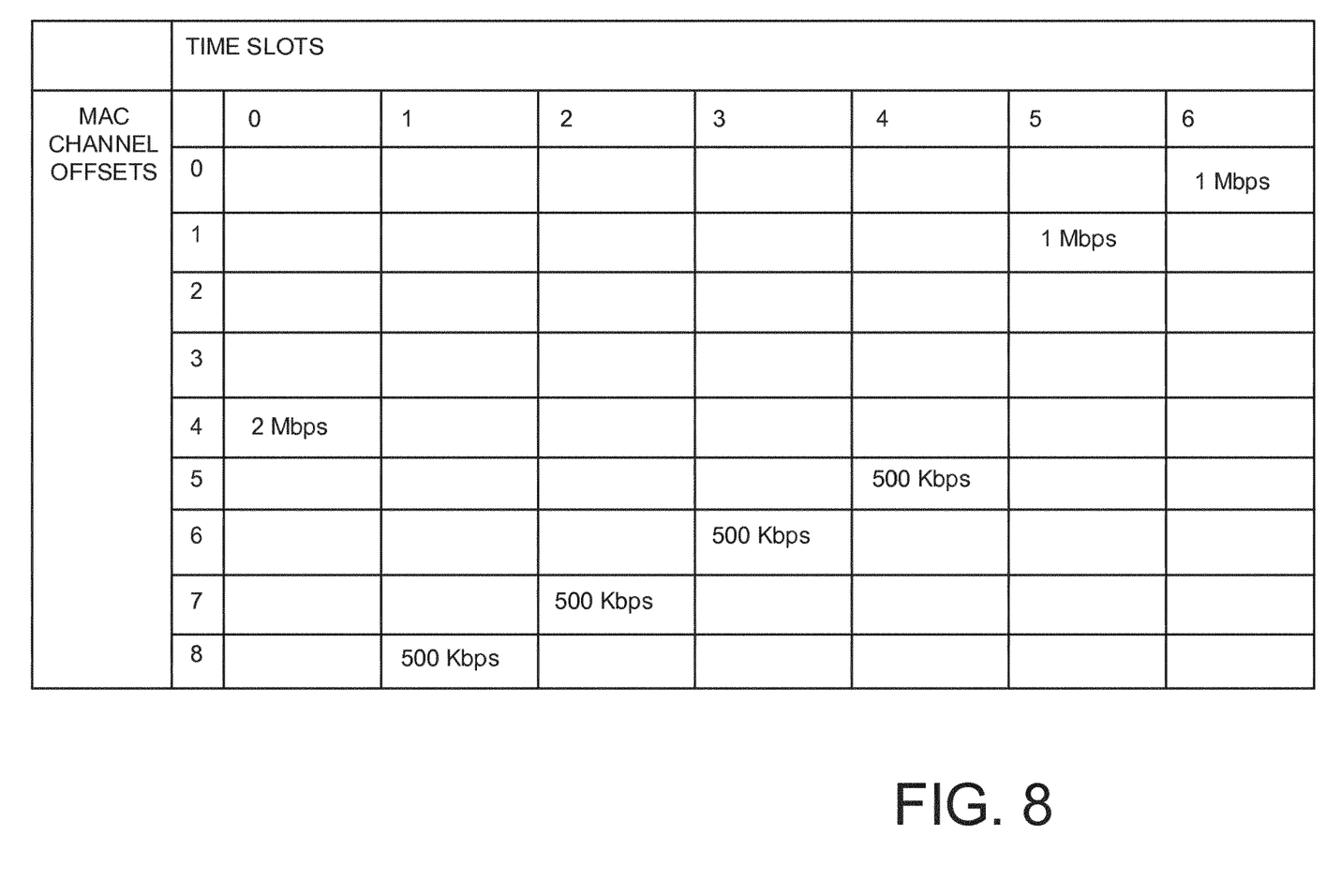
FIG. 8 is a chart illustrating a TSCH slot frame for a network that communicates using multiple data rates.

As illustrated in FIG. 8, in another example, a node device 300 can transmit across multiple timeslots based on the data rate of its respective transmission. A TSCH schedule can be defined using macChannelOffsets and a macHoppingSequenceList vector, for example. Each node device 300 can be assigned a unique macChannelOffset, and the macHoppingSequenceList can include a list of entries corresponding to physical channel frequencies. The macChannelOffset and a macASN can then be used to index into the macHoppingSequenceList to determine a channel frequency for transmission. The macASN can be a real time indicator indicative of the current slotFrame, for example. In one embodiment, a node device 300 can obtain a present transmission channel frequency using the equation: Channel=macHoppingSequenceList [(macASN+macChannelOffset) % macHoppingSequenceLength], where the macHoppingSequenceLength is a length of the macHoppingSequenceList vector.

In the example illustrated in FIG. 8, the node devices 300 are able to transmit using at least three different data rates: 2 Mbps, 1 Mbps, and 500 Kbps. The timeslot length is set using the data rate of 2 Mbps, as that is the maximum data rate used in the network. During timeslot 1, a node device 300 transmits a packet at 2 Mbps. Only 1 timeslot is needed as the node device 300 transmitted the data at the maximum data rate.

At timeslot 2, another node device 300 starts to transmit at a data rate of 500 Kbps. Because this data rate is four times slower than the maximum data rate of 2 Mbps, it will take four timeslots to transmit the full packet. In order to achieve this, the macChannelOffset for the node device 300 is decremented by 1 each timeslot in order to ensure that the node device 300 continues to transmit on the same channel for the duration of the packet transmission. After four timeslots, the transmission is complete. A new node device 300 begins transmitting at timeslot 5 at a data rate of 1 Mbps. Because it is twice as slow as the maximum data rate, two timeslots are scheduled for the transmission. Like the previous device, the macChannelOffset for the current device is decremented by 1 for the second timeslot in order to ensure the full transmission occurs on the same channel. Like dynamic timeslots, the network needs to know which node devices 300 will be transmitting on which channels and at which data rates in order to set the length of the slotframe accordingly, so that each slotframe includes enough timeslots to accommodate transmissions at varying data rates for all node devices 300.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in an aspect are still deemed to fall within the scope of that aspect. Moreover, in the following aspects, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above Detailed Description, various features may be grouped together to streamline the disclosure. Thus, the following aspects are hereby incorporated into the Detailed Description as examples or embodiments, with each aspect standing on its own as a separate embodiment, and it is contemplated that such embodiments can be combined with each other in various combinations or permutations. The scope of the invention should be determined with reference to the appended aspects, along with the full scope of equivalents to which such aspects are entitled.

The invention claimed is:

1. A wireless node configured to enhance one or more of power efficiency, interference immunity, packet latency, or packet throughput using dynamically-established link configurations, the wireless node comprising:
   a transceiver configured to transmit and receive wireless communication via an antenna, the wireless node configured to receive wireless communication from a network manager; and
   a cognitive engine configured to receive information regarding a network environment as input and, in response, generate transmission configuration data as output based on an environmental model tracking variances in the network environment;

wherein the wireless node is configured to generate a data communication for transmission by the transceiver to the network manager using the generated configuration data, and wherein the generated configuration data includes transmission channel frequency and transmission data rate information.

2. The wireless node of claim 1, wherein the generated transmission configuration data includes at least one of a transmission channel frequency, a transmission data rate, a transmission modulation format, a transmission power level of the node transceiver, a transmission packet format, or a transmission channel coding scheme.

3. The wireless node of claim 1, wherein wireless communication between the network manager and the wireless node is scheduled according to time synchronized channel hopping (TSCH) scheme.

4. The wireless node of claim 3, wherein the
environmental model configured to instantiate a moving average filter to track packet transmission results between the wireless node and the network manager, and a moving average variance filter to track a received signal strength indicator of received acknowledgement packets from the network manager.

5. The wireless node of claim 4, wherein the cognitive engine further comprises:
a channel policy agent configured to receive a set of channel frequencies and the moving average filter as input and output a selected transmission channel frequency; and
a data rate policy agent configured to receive a set of data rates and the moving average variance filter as input and output a selected transmission data rate;
wherein the generated transmission configuration data includes the transmission channel frequency and the transmission data rate.

6. The wireless node of claim 5, wherein the wireless node is configured to receive an acknowledgment packet from the network manager in response to the data communication, and wherein the wireless node updates the environmental model using one or more characteristics obtained from receiving the acknowledgment packet.

7. The wireless node of claim 6, wherein one or more characteristics obtained from receiving the acknowledgement packet include at least one of a received signal strength indicator or a signal-to-noise ratio.

8. The wireless node of claim 1, wherein the wireless node is positioned on an automobile and configured to sense parameters of a battery module.

9. A wireless communication system comprising:
a network manager configured to wirelessly communicate with a plurality of wireless nodes of a wireless network according to a communication schedule, the network manager comprising:
a first transceiver configured to transmit and receive wireless communication via an antenna; and
a cognitive engine configured to receive information regarding an environment of the wireless network as input and, in response, generate transmission configuration data as output based on an environmental model tracking variances in the environment;
wherein the network manager is configured to transmit an updated communication schedule to the plurality of wireless nodes that includes the generated transmission configuration data, and wherein the generated transmission configuration data includes transmission channel frequency and transmission data rate information.

10. The wireless communication system of claim 9, wherein the generated transmission configuration data includes at least one of a transmission channel frequency, a transmission data rate, a transmission modulation format, a transmission power level of the first transceiver, a transmission packet format, or a transmission channel coding scheme.

11. The wireless communication system of claim 9, wherein the communication schedule is a time synchronized channel hopping (TSCH) schedule.

12. The wireless communication system of claim 11, wherein the
environmental model configured to instantiate a moving average filter to track packet transmission results between the plurality of wireless nodes and the network manager, and a moving average variance filter to track a received signal strength indicator of received packets from respective wireless nodes.

13. The wireless communication system of claim 12, wherein the cognitive engine further comprises:
a channel policy agent configured to receive a set of channel frequencies and the moving average filter as input and output a selected transmission channel frequency; and
a data rate policy agent configured to receive a set of data rates and the moving average variance filter as input and output a selected transmission data rate;
wherein the generated transmission configuration data includes the transmission channel frequency and the transmission data rate.

14. The wireless communication system of claim 13, wherein the network manager receives a data communication from a respective wireless node and updates the environmental model using one or more characteristics obtained from receiving the data communication.

15. The wireless communication system of claim 14, wherein one or more characteristics obtained from receiving the data communication includes at least one of a received signal strength indicator or a signal-to-noise ratio.

16. The wireless communication system of claim 9, wherein the plurality of network nodes are positioned on an automobile and configured to sense parameters of a battery module.

17. A method of wireless communication, the method comprising:
communicating, via a transceiver of a wireless device, wireless data with other devices of a wireless network according to a communication schedule of the wireless network;
extracting information regarding an environment of the wireless network from communication of the wireless data;
providing the information to a cognitive engine of the wireless device to generate, by the cognitive engine, configuration data based on an environmental model tracking variances in the environment; and
communicating subsequent wireless data according to an updated communication configuration using the generated configuration data,
wherein the generated configuration data includes transmission channel frequency and transmission data rate information.

18. The method of claim 17, wherein the wireless device is a network manager configured to wirelessly communicate with a plurality of wireless nodes of the wireless network according to the communication schedule, and wherein the updated communication configuration includes an updated communication schedule and transmission configuration data for communication between the network manager and the plurality of wireless nodes.

19. The method of claim 18, wherein the communication schedule is a time synchronized channel hopping (TSCH) schedule.

20. The method of claim 17, wherein the wireless device is a wireless node configured to wirelessly communicate with a network manager of the wireless network, and wherein transmitting and receiving the subsequent wireless communication according to the updated communication configuration comprises the wireless node generating data communication for transmission by a node transceiver of the wireless node to the network manager using the generated configuration data.

* * * * *